United States Patent
Muraki

(10) Patent No.: US 8,359,487 B2
(45) Date of Patent: Jan. 22, 2013

(54) SYSTEM AND METHOD FOR EFFECTIVELY PERFORMING A CLOCK ADJUSTMENT PROCEDURE

(75) Inventor: Yosuke Muraki, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 853 days.

(21) Appl. No.: 12/077,422

(22) Filed: Mar. 19, 2008

(65) Prior Publication Data

US 2009/0240973 A1 Sep. 24, 2009

(51) Int. Cl.
*G06F 1/26* (2006.01)
(52) U.S. Cl. ........ 713/322; 713/300; 713/320; 713/323; 713/324
(58) Field of Classification Search .................. 713/300, 713/320, 322, 323, 324; 714/10, 11
See application file for complete search history.

(56) References Cited

U.S. PATENT DOCUMENTS

| | | | |
|---|---|---|---|
| 2005/0289365 A1* | 12/2005 | Bhandarkar | 713/300 |
| 2006/0117199 A1 | 6/2006 | Bailey et al. | |
| 2007/0146373 A1* | 6/2007 | Cool et al. | 345/502 |
| 2007/0260895 A1* | 11/2007 | Aguilar et al. | 713/300 |
| 2008/0028154 A1* | 1/2008 | Hoover et al. | 711/130 |
| 2008/0101523 A1* | 5/2008 | Kurd et al. | 375/376 |
| 2008/0276026 A1* | 11/2008 | Branover et al. | 710/260 |
| 2009/0132844 A1* | 5/2009 | Allarey et al. | 713/340 |

* cited by examiner

*Primary Examiner* — Paul Yanchus, III
(74) *Attorney, Agent, or Firm* — Sony Corporation of America

(57) ABSTRACT

A system and method for effectively performing a clock adjustment procedure includes a multi-core processor that has a plurality of processor cores that each operate with reference to a target clock signal for performing various processing tasks. The processor cores include functional processor cores and one or more non-functional processor cores. A clock manager performs the clock adjustment procedure under control of a master processor core by selecting and applying a target clock frequency for the target clock signal. The target clock frequency is selected to allow the functional processor cores to compensate for the non-functional processor cores by collectively performing all of the required processing tasks.

19 Claims, 9 Drawing Sheets

| | | | | |
|---|---|---|---|---|
| | All Functional | 3 Functional | 2 Functional | 1 Functional |
| Target Frequency | 1 GHz | 1.33 + a (GHz) | 2 + a (GHz) | 4 + a (GHz) |
| PLL Ratio | x 10 | x (4/3) | x (20) | x (40) |

SYSTEM AND METHOD FOR EFFECTIVELY PERFORMING A CLOCK ADJUSTMENT PROCEDURE

BACKGROUND SECTION

1. Field of Invention

This invention relates generally to techniques for implementing electronic devices, and relates more particularly to a system and method for effectively performing a clock adjustment procedure.

2. Description of the Background Art

Implementing effective methods for implementing electronic devices is a significant consideration for designers and manufacturers of contemporary electronic systems. However, effectively implementing electronic devices may create substantial challenges for device designers. For example, enhanced demands for effectively implementing electronic devices may require more system processing power and require additional hardware or software resources. An increase in processing or software requirements may also result in a corresponding detrimental economic impact due to increased production costs and operational inefficiencies.

Furthermore, enhanced device capabilities to perform various advanced processing operations may provide additional benefits to device users, but may also place increased demands on the control and management of various system components. For example, an enhanced electronic device that utilizes a multi-core processor to effectively process various types of digital data may benefit from an efficient implementation because of the large amount and complexity of the digital data involved.

Due to growing demands on system resources and substantially increasing data magnitudes, it is apparent that developing new techniques for implementing electronic devices is a matter of concern for related electronic technologies. Therefore, for all the foregoing reasons, developing effective techniques for implementing electronic devices remains a significant consideration for designers, manufacturers, and users of contemporary electronic devices.

SUMMARY

In accordance with the present invention, a system and method for effectively performing a clock adjustment procedure is disclosed. In one embodiment of the invention, a multi-core processor includes a plurality of processor cores that each operate with reference to a target clock signal for performing various required processing tasks. The processor cores may include functional processor cores and non-functional processor cores. A master processor core from among the functional processor cores may utilize a clock manager program to perform a clock adjustment procedure that increases a target clock frequency of the target clock signal. The functional processors may thus operate at a faster rate for performing the processing tasks that were originally designated for the non-functional processor cores.

In one embodiment, operating power is initially applied to an electronic device that includes a multi-core processor with a plurality of processor cores. Each of the processor cores are preferably referenced to a target clock signal that is derived by a phase-locked loop (PLL) from a source clock signal at a specified PLL ratio. A clock manager of the electronic device may read processor fuses to determine certain relevant information for performing the clock adjustment procedure. For example, the clock manager may read the processor fuses determine the number of functional processor cores in multi-core processor.

Alternately, appropriate self-tests (such as built-in self tests (BIST)) may be run on the individual processor cores to determine the number of functional processor cores in multi-core processor. The clock manager also determines other calculation values for performing the clock adjustment procedure. These calculation values may include the total number of processor cores (both functional and non-functional) in the multi-core processor, a current PLL ratio for the PLL of the multi-core processor, and a latency margin value for the multi-core processor.

In certain embodiments, the clock manager calculates an appropriate required target clock frequency for the functional processor cores in light of any reduction in the original total number of processor cores in the multi-core processor. In certain embodiments, this required target clock frequency may include a latency margin value to compensate for latency characteristics of the multi-core processor. A clock adjustment method may then be selected from either a source-clock adjustment method or a PLL-ratio adjustment method.

If a source-clock adjustment method is selected, the clock manager calculates an appropriate source clock frequency based upon the foregoing calculation values. The clock manager then adjusts the source clock frequency of a source clock generator to complete the clock adjustment procedure. However, if a PLL ratio adjustment method is selected, the clock manager calculates an appropriate PLL ratio for the PLL based upon the foregoing calculation values. The clock manager then adjusts the PLL ratio of the PLL to complete the clock adjustment procedure. Finally, the multi-core processor may effectively execute appropriate application software for a host electronic device. For at least the foregoing reasons, the present invention therefore provides an improved system and method for effectively performing a clock adjustment procedure.

DETAILED DESCRIPTION

The present invention relates to an improvement in electronic device implementation techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing a clock adjustment procedure, and includes a multi-core processor that has a plurality of processor cores that each operate with reference to a target clock signal for performing various required processing tasks. The processor cores include functional processor cores and one or more non-functional processor cores. A clock manager performs the clock adjustment procedure under control of a master processor core by selecting and applying a target clock frequency for the target clock signal. The target clock frequency is selected to allow the functional processor cores to compensate for the non-functional processor cores by collectively performing all of the required processing tasks.

Figure 1:
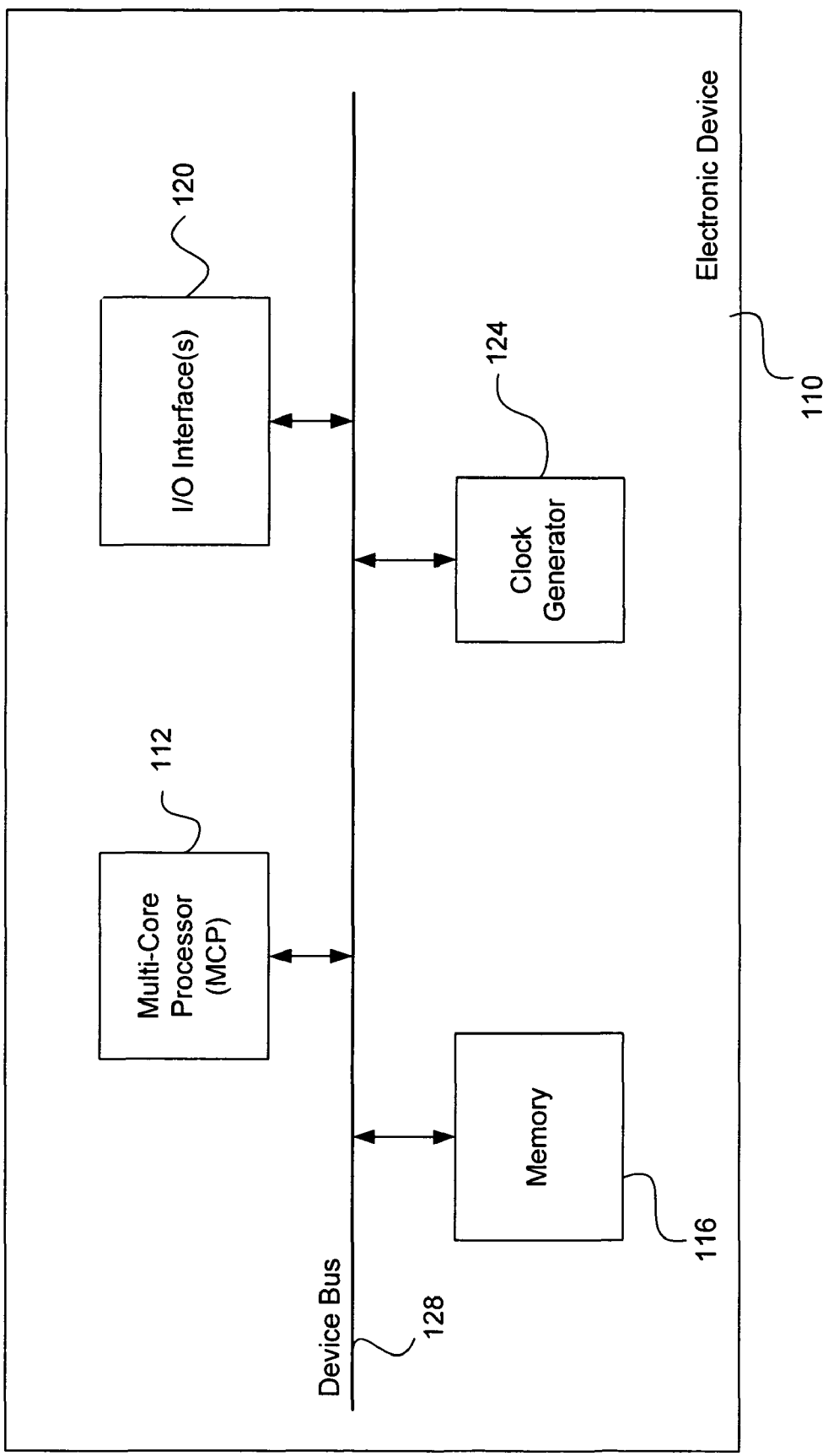
FIG. 1 is a block diagram for one embodiment of an electronic device, in accordance with the present invention.

Referring now to FIG. 1, a block diagram for one embodiment of an electronic device 110 is shown, in accordance with the present invention. In the FIG. 1 embodiment, electronic device 110 includes, but is not limited to, a multi-core processor (MCP) 112, a memory 116, input/output interface(s) (I/O interface(s)) 120, and a clock generator 124. The foregoing components of electronic device 110 may be coupled to, and communicate through, a device bus 128.

In various embodiments, electronic device 110 may be implemented as any appropriate type of electronic device or system. For example, electronic device 110 may be implemented as an electronic system board, a computer device, an electronic gaming device, or a consumer electronics device. In addition, electronic device 110 may be implemented using components and configurations in addition to, or instead of, certain of those components and configurations discussed below in conjunction with the FIG. 1 embodiment.

In the FIG. 1 embodiment, multi-core processor 112 may be implemented to include any appropriate and compatible set of processor devices that execute software instructions to control and manage the operations of electronic device 110. In the FIG. 1 embodiment, I/O interface(s) 120 may include one or more input and/or output interfaces to receive and/or transmit any required types of information to or from electronic device 110. In the FIG. 1 embodiment, clock generator 124 generates a source clock signal that is utilized by MCP 112 to derive a target clock signal for synchronizing and triggering instruction execution cycles and other processing functions. In the FIG. 1 embodiment, memory 116 may be implemented to include any combination of desired storage devices, including, but not limited to, read-only memory (ROM), random-access memory (RAM), and various types of non-volatile memory, such as floppy disks or hard disks. Additional details regarding the functionality and implementation of electronic device 112 are further discussed below in conjunction with FIGS. 2-6.

Figure 2:
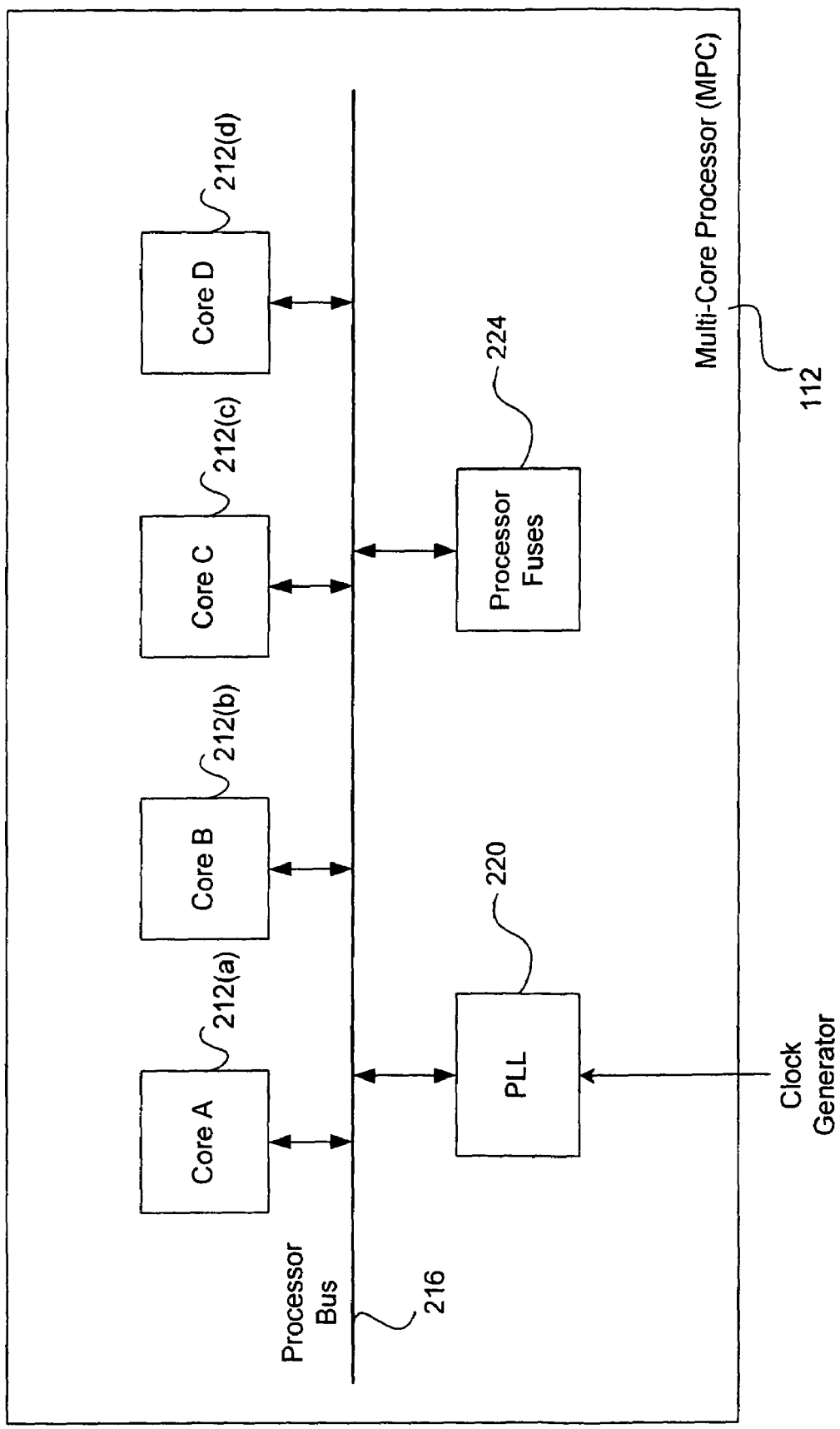
FIG. 2 is a block diagram for one embodiment of the multi-core processor of FIG. 1, in accordance with the present invention.

Referring now to FIG. 2, a block diagram of the FIG. 1 multi-core processor (MPC) 112 is shown, in accordance with one embodiment of the present invention. In alternate embodiments, MPC 112 may be implemented using components and configurations in addition to, or instead of, certain of those components and configurations discussed in conjunction with the FIG. 2 embodiment.

In the FIG. 2 embodiment, MCP 112 includes four discrete processor cores (core A 212(a), core B 212(b), core C 212(c), and core D 212(d)). In alternate embodiments, any appropriate number of processor cores 212 may be utilized. In the FIG. 2 embodiment, each processor core 212 is similarly configured as an individual processor device for executing software instructions to perform various processing tasks for electronic device 110 (FIG. 1). Processor cores 212 may be implemented in any effective manner, including as Cell Processors manufactured by Sony Corporation. In the FIG. 2 embodiment, the individual components of MCP 112 communicate through a processor bus 216 that is coupled to device bus 128 (FIG. 1) of electronic device 110.

In the FIG. 2 embodiment, MCP 112 also includes a phase-locked loop (PLL) 220 that receives a source clock signal from clock generator 124 (FIG. 1) and responsively generates a target clock signal for processor cores 212 to each utilize as a clock reference. PLL 220 may be implemented in any effective manner. For example, PLL 220 may be implemented according to known techniques to adjust the source clock frequency of the source clock signal according to a PLL ratio to thereby produce the target clock signal at a different target clock frequency. In the FIG. 2 embodiment, MCP 112 may include processor fuses 224 that store various relevant information about MCP 112 and related functionalities.

In the FIG. 2 embodiment, in certain environments, each processor core 212 may be responsible for executing a different respective processing task at the target clock frequency. In accordance with the present invention, if one or more of the processor cores 212 are non-functional or defective for any reason, a master processor core from among the remaining functional processor cores 212 may utilize a clock manager program to perform a clock adjustment procedure that advantageously increases the target clock frequency to thereby allow the remaining functional processors 212 to operate at a faster rate for performing the processing task that was originally designated for the non-functional processor core. Additional details for performing clock adjustment procedures are further discussed below in conjunction with FIGS. 3-6.

Figure 3:
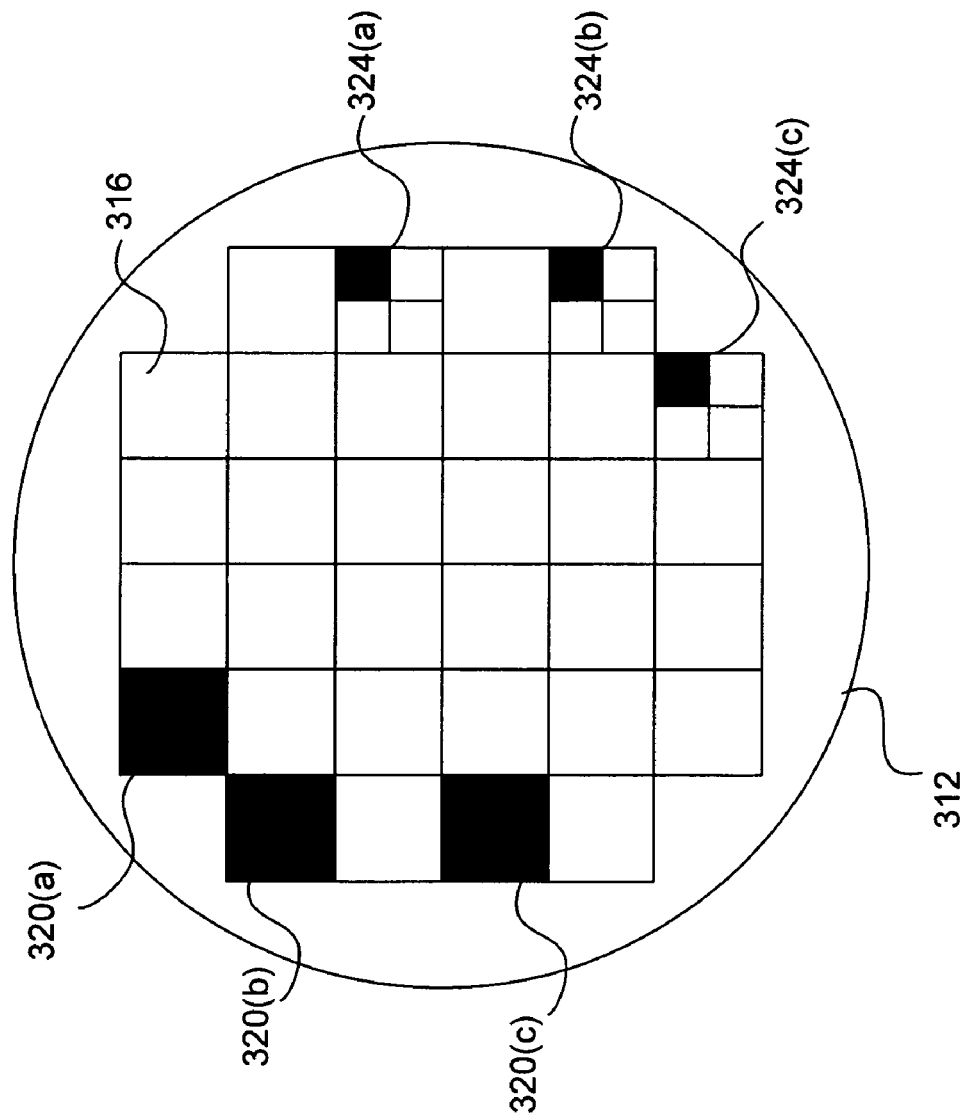
FIG. 3 is a diagram illustrating one embodiment of an integrated circuit manufacturing process, in accordance with the present invention.

Referring now to FIG. 3, a diagram illustrating one embodiment of an integrated-circuit manufacturing process is shown, in accordance with one embodiment of the present invention. The FIG. 3 example is presented for purposes of illustration, and in alternate embodiments, integrated circuits may be manufactured using techniques and configurations in addition to, or instead of, certain of those techniques and configurations discussed in conjunction with the FIG. 2 embodiment.

In the FIG. 3 embodiment, a silicon wafer 312 is shown from which a set of similar integrated circuits are manufactured. In the FIG. 3 example, for purposes of simplicity, thirty-two integrated circuits are depicted as thirty-two individual squares, however, any appropriate number of integrated circuits may be manufactured from silicon wafer 312. In the FIG. 3 example, each of the integrated circuits may be configured in a manner similar to the multi-core processor 112 shown in FIG. 2. In other words, each FIG. 3 integrated circuit includes four processor cores.

Due to various manufacturing defects, certain of the MCPs may have one or more non-functional processor cores. In the FIG. 3 example, out of the total of thirty-two multi-core processors, twenty-six are depicted in white (such as MCP 316) to symbolize that all four processor cores 212 are functional. In addition, the FIG. 3 example includes three defective MPCs 320(a), 320(b), and 320(c) that are depicted in black to indicate that all processor cores are non-functional.

In integrated circuit manufacturing, the cost of silicon wafers 312 is a substantial factor in overall production costs. Therefore, maximizing the total manufacturing yield of functional integrated circuits per silicon wafer is a significant goal. The FIG. 3 example also includes three MCPs 324(a), 324(b), and 324(c) that each includes one black quadrant to symbolize that at least one (but not all) processor cores 212 are non-functional. As discussed above in conjunction with FIG. 2, the present invention may be utilized to compensate for such partially defective multi-core processors to thereby advantageously increase the manufacturing yield of useable integrated circuits from a given silicon wafer 312. In certain other embodiments, the present invention may also advantageously be utilized to dynamically compensate for processor cores 212 that suddenly become non-functional after operating successfully for some time as functional processor cores 212 in a multi-core processor.

Figure 4:
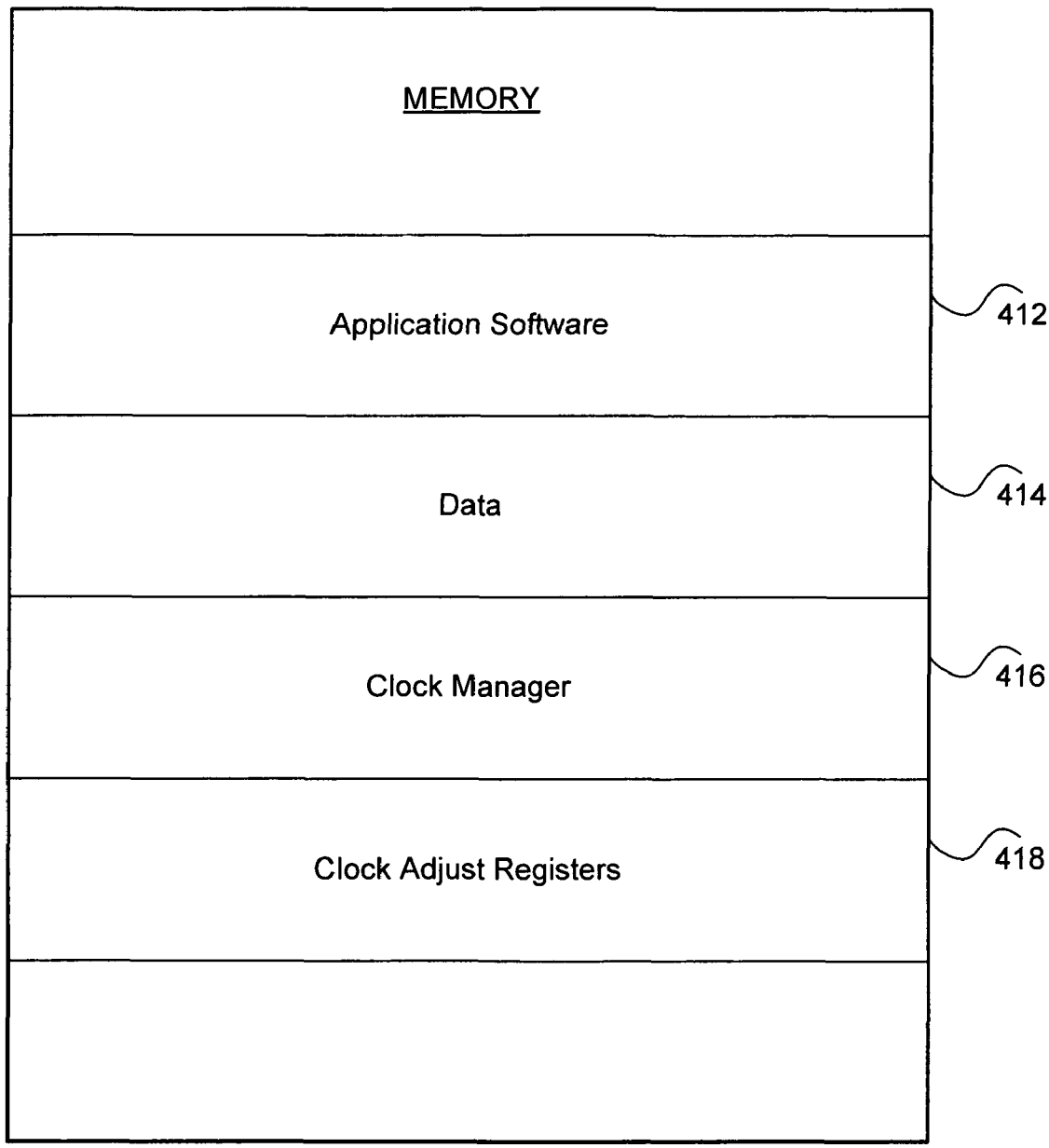
FIG. 4 is a block diagram for one embodiment of the memory of FIG. 1, in accordance with the present invention.

Referring now to FIG. 4, a block diagram of the FIG. 1 memory 116 is shown, in accordance with one embodiment of the present invention. In alternate embodiments, memory 116 may be implemented using components and configurations in addition to, or instead of, certain of those components and configurations discussed in conjunction with the FIG. 4 embodiment.

In the FIG. 4 embodiment, application software 412 may include program instructions that are preferably executed by multi-core processor 112 (FIG. 2) to perform various functions and operations for electronic device 110. The particular nature and functionality of application software 412 typically varies depending upon factors such as the specific type and particular use of the corresponding electronic device 110. In the FIG. 2 embodiment, data 414 may include any type of information for use by electronic device 110. For example, in an electronic gaming application, data 414 may include, but is not limited to, various appropriate types of graphics and audio data.

In the FIG. 4 embodiment, clock manager 416 includes program instructions for execution by a master processor core 212 (FIG. 2) to perform appropriate clock adjustment procedures, in accordance with the present invention. Clock manager 416 may utilize clock adjust registers 418 to store any required information, values, or data for performing the clock adjustment procedures. The effective utilization of clock manager 416 to perform clock adjustment procedures is further discussed below in conjunction with FIGS. 5-6.

Figure 5A:
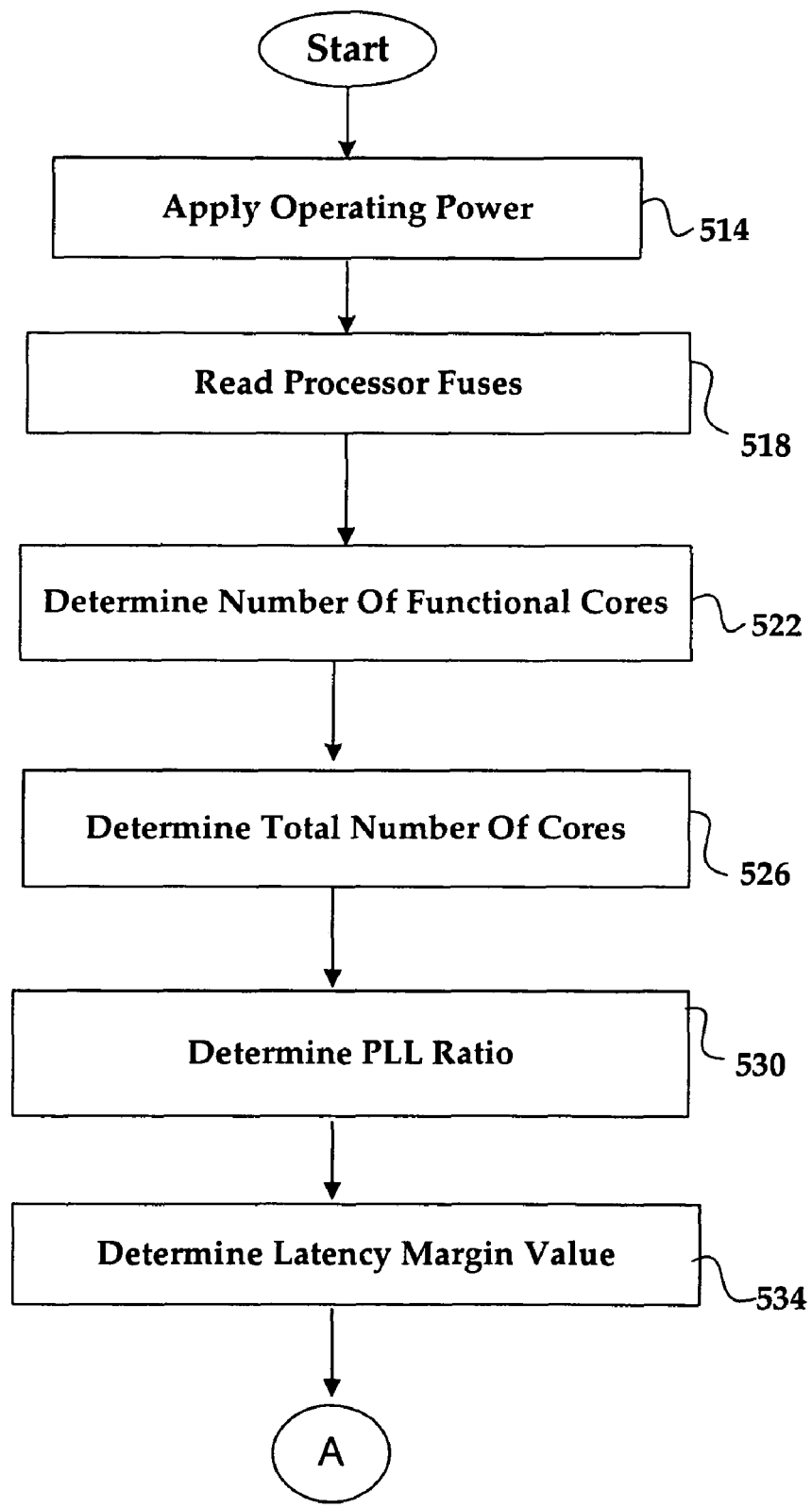
FIGS. 5A-5C are a flowchart of method steps for performing a clock adjustment procedure, in accordance with one embodiment of the present invention.
Figure 5B:
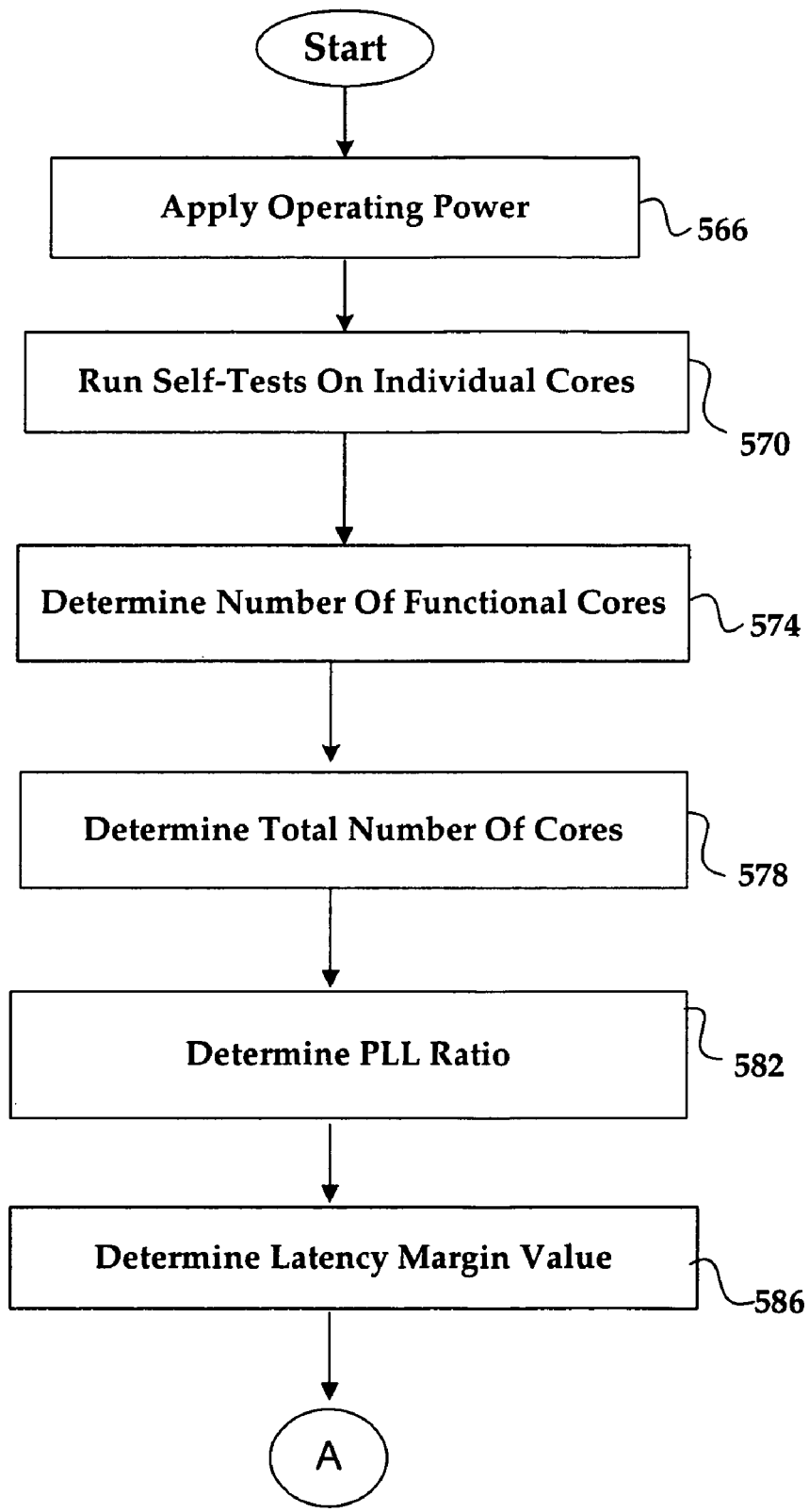
Figure 5C:
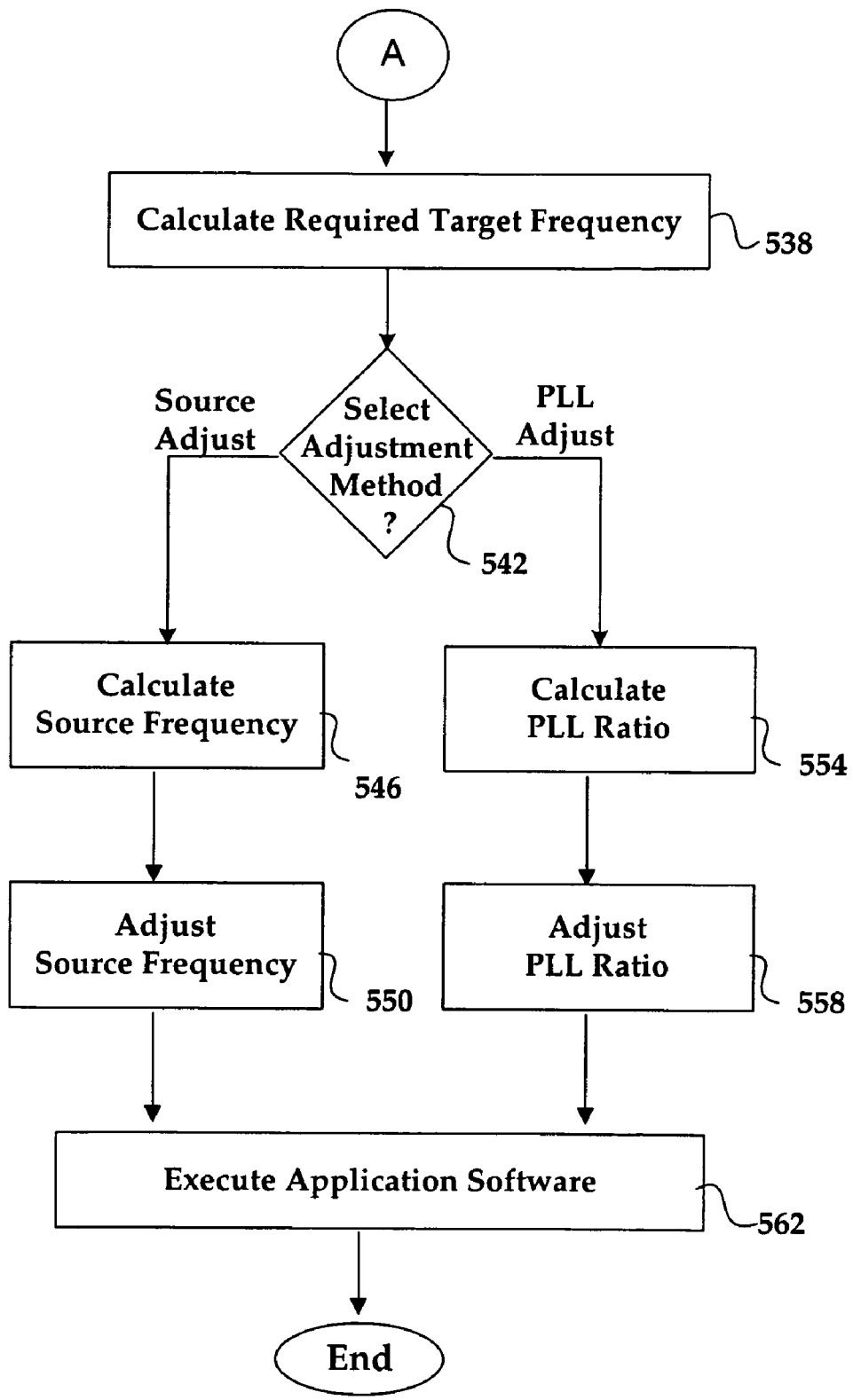

Referring now to FIGS. 5A-5C, a flowchart of method steps for performing a clock adjustment procedure is shown, in accordance with one embodiment of the present invention. In alternate embodiments, the present invention may perform clock adjustment procedures by utilizing steps and sequences other than certain of those steps and sequences discussed in conjunction with the embodiment of FIGS. 5A-5C.

In step 514 of FIG. 5A, operating power is initially applied to an electronic device 110 that includes a multi-core processor 112 with a plurality of processor cores 212. Each of the processor cores 212 are preferably referenced to a target clock signal that is derived by a phase-locked loop (PLL) 220 from a source clock signal according to a specified PLL ratio. In step 518, a clock manager 416 of the electronic device 110 reads processor fuses 224 to determine certain relevant information for performing the clock adjustment procedure. For example, in step 522, clock manager 416 determines the number of functional processor cores 212 in multi-core processor 112.

In step 526, clock manager 416 determines the total number of processor cores 212 (both functional and non-functional) in multi-core processor 112. In step 530, clock manager 416 determines the current PLL ratio for the PLL 220 of multi-core processor 112. In step 534, clock manager 416 determines a latency margin value for multi-core processor 112. The FIG. 5A process may then advance to step 538 of FIG. 5C through connecting letter "A."

FIG. 5B is presented here as an alternate technique for performing the steps of foregoing FIG. 5A. In step 566 of FIG. 5B, operating power is initially applied to an electronic device 110 that includes a multi-core processor 112 with a plurality of processor cores 212. Each of the processor cores 212 are preferably referenced to a target clock signal that is derived by a phase-locked loop (PLL) 220 from a source clock signal at a specified PLL ratio. In step 570, self-tests (such as a known built-in self test (BIST)) are run on the individual processor cores 212 to determine certain relevant information for performing the clock adjustment procedure. For example, in step 574, the number of functional processor cores 212 in multi-core processor 112 are determined.

In step 578, clock manager 416 determines the total number of processor cores 212 (both functional and non-functional) in multi-core processor 112. In step 582, clock manager 416 determines the current PLL ratio for the PLL 220 of multi-core processor 112. In step 586, clock manager 416 determines a latency margin value for multi-core processor 112. The FIG. 5B process may then advance to step 538 of FIG. 5C through connecting letter "A."

In the FIG. 5C embodiment, clock manager 416 calculates an appropriate required target clock frequency for the currently functional processor cores 212 in light of any reduction in the originally-intended total number of processor cores 212 in multi-core processor 112. In certain embodiments, this required target clock frequency may include a latency margin value to compensate for latency characteristics of multi-core processor 112.

In step 542, a clock adjustment method may be selected for performing the clock adjustment procedure. If a source clock adjustment procedure is selected, then in step 546, clock manager 416 calculates an appropriate source clock frequency based upon the foregoing calculation values determined previously. In step 550, clock manager 416 then adjusts the source clock frequency of clock generator 124 (FIG. 1) to complete the clock adjustment procedure.

However, if a PLL ratio adjustment procedure is selected, then in step 554, clock manager 416 calculates an appropriate PLL ratio for PLL 220 (FIG. 2) based upon the foregoing calculation values determined previously. In step 558, clock manager 416 then adjusts the PLL ratio of PLL 220 to complete the clock adjustment procedure. Finally, in step 562, multi-core processor 112 may effectively execute application software 412 (FIG. 4) to operate electronic device 110. For at least the foregoing reasons, the present invention therefore provides an improved system and method for effectively performing a clock adjustment procedure.

Figure 6A:
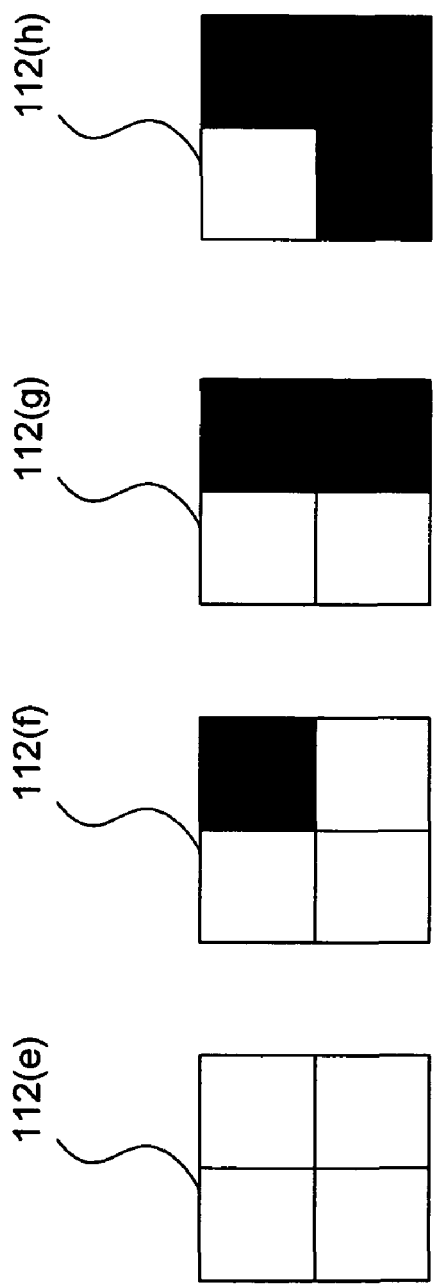
FIGS. 6A-6B are diagrams illustrating several examples of clock frequency calculations, in accordance with one embodiment of the present invention.
Figure 6B:
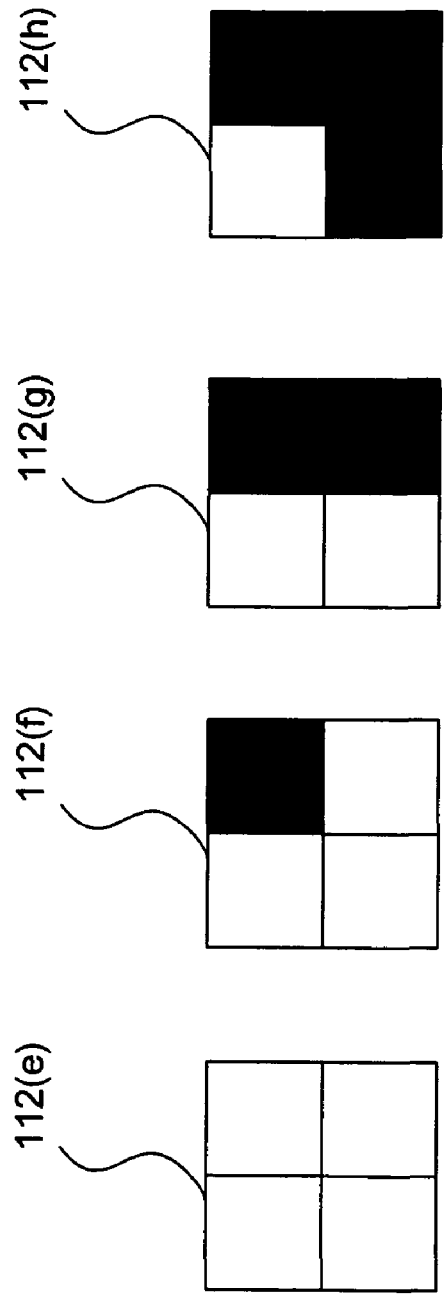

Referring now to FIGS. 6A-6B, diagrams illustrating several examples of clock frequency calculations are shown, in accordance with one embodiment of the present invention. The FIG. 6 examples are presented for purposes of illustration, and in alternate embodiments, clock frequencies may be calculated using techniques and values in addition to, or instead of, certain of those techniques and values discussed in conjunction with the FIG. 6 embodiment.

In the FIG. 6A embodiment, four examples of clock frequency calculations are shown corresponding to the multi-core processor 112 discussed above in conjunction with FIGS. 2-3. A source clock frequency for the source clock signal generated by clock generator 124 (FIG. 1) is shown, and a target clock frequency that is provided directly to processor cores 212 by PLL 220 (FIG. 2) is also shown.

The present invention may determine appropriate values and variables for performing clock adjustment procedures by utilizing any effective techniques. For example, in one embodiment, clock manager 416 (FIG. 4) may calculate certain relevant clock frequencies according the following formula:

$Nt/Nf \times F/M$ = Source Clock Frequency where Nt is a total number of processor cores 212 in multi-core processor 112, Nf is a total number of functional processor cores 212 in multi-core processor 112, F is a target clock frequency provided directly to processor cores 212, and M is a PLL ratio by which PLL 220 (FIG. 2) increases the source clock frequency to obtain the target clock frequency. In the FIG. 6A example, the PLL ratio is selected to be equal to 10.

In the FIG. 6A examples, a first example is shown with all processor cores 212 being functional. The target clock frequency is selected to be 1 GHz, and the source clock is therefore equal to 100 MHz. In a second example, three processor cores 212 are shown as being functional. The target clock frequency is adjusted to 1.33 GHz, and the source clock is therefore equal to 133 MHz. In the second example, the target clock frequency and the source clock frequency may be incremented to include a latency margin value "a" that compensates for various latency characteristics of multi-core processor 212.

In a third example, two processor cores 212 are shown as being functional. The target clock frequency is adjusted to 2 GHz, and the source clock is therefore equal to 200 MHz. In the third example, the target clock frequency and the source clock frequency may be incremented to include a latency margin value "a" that compensates for various latency characteristics of multi-core processor 212. In a fourth example, only one processor core 212 is shown as being functional. The target clock frequency is adjusted to 4 GHz, and the source clock is therefore equal to 400 MHz. In the fourth example, the target clock frequency and the source clock frequency may be incremented to include a latency margin value "a" that compensates for various latency characteristics of multi-core processor 212.

In certain embodiments, clock manager 416 may alternately adjust the PLL ratio according to the foregoing formula to obtain the desired target clock frequency, instead of adjusting the source clock frequency, as depicted in the FIG. 6A examples. For example, in the FIG. 6B embodiment, four additional examples of clock frequency calculations are shown corresponding to the multi-core processor 112 discussed above in conjunction with FIGS. 2-3. A target clock frequency that is provided directly to processor cores 212 by PLL 220 (FIG. 2) is shown, and a PLL ratio for operating PLL 220 (FIG. 2).

The present invention may determine appropriate values and variables for performing clock adjustment procedures by utilizing any effective techniques. For example, in one embodiment, clock manager 416 (FIG. 4) may calculate certain relevant clock frequencies according the foregoing formula. In the FIG. 6B example, the source clock frequency is selected to be equal to 100 MHz.

In the FIG. 6B examples, a first example is shown with all processor cores 212 being functional. The target clock frequency is selected to be 1 GHz, and the PLL ratio is therefore equal to 10. In a second example, three processor cores 212 are shown as being functional. The target clock frequency is adjusted to 1.33 GHz, and the PLL ratio is therefore equal to 4/3. In the second example, the target clock frequency may be incremented to include a latency margin value "a" that compensates for various latency characteristics of multi-core processor 212.

In a third example, two processor cores 212 are shown as being functional. The target clock frequency is adjusted to 2 GHz, and the PLL ratio is therefore equal to 20. In the third example, the target clock frequency may be incremented to include a latency margin value "a" that compensates for various latency characteristics of multi-core processor 212. In a fourth example, only one processor core 212 is shown as being functional. The target clock frequency is adjusted to 4 GHz, and the PLL ratio is therefore equal to 40. In the fourth example, the target clock frequency may be incremented to include a latency margin value "a" that compensates for various latency characteristics of multi-core processor 212.

The present invention is disclosed and discussed in the context of processor cores 212 from a multi-core processor 112. However, in various alternate embodiments, the same or similar principles may be utilizing in any environment in which multiple redundant electronic devices perform tasks in accordance with a reference clock.

The invention has been explained above with reference to certain embodiments. Other embodiments will be apparent to those skilled in the art in light of this disclosure. For example, the present invention may readily be implemented using configurations and techniques other than certain of those described in the embodiments above. Additionally, the present invention may effectively be used in conjunction with systems other than certain of those described above. Therefore, these and other variations upon the discussed embodiments are intended to be covered by the present invention, which is limited only by the appended claims.

What is claimed is:

1. A system for performing a clock adjustment procedure, comprising:
   a multi-core processor that includes a plurality of processor cores that each operate with reference to a target clock signal to perform processing tasks, said processor cores including one or more non-functional processor cores, remaining ones of said processor cores being functional processor cores; and
   a clock manager that performs said clock adjustment procedure by selecting a target clock frequency for said target clock signal, said target clock frequency allowing said functional processor cores to compensate for said non-functional processor cores by collectively performing said processing tasks, said clock manager determining a latency margin for said multi-core processor to obtain a latency margin value for performing said clock adjustment procedure.

2. The system of claim 1 wherein said clock adjustment procedure permits successfully utilizing said multi-core processor in an electronic device when at least one of said processor cores is defective and not functional, said clock adjustment procedure therefore permitting an increased manufacturing yield for useable integrated circuits per silicon wafer during an integrated-circuit manufacturing procedure.

3. The system of claim 1 wherein one of said functional processor cores is implemented as a master processor core to control said clock manager for performing said clock adjustment procedure.

4. The system of claim 1 wherein said multi-core processor is implemented on a system board of an electronic gaming device.

5. The system of claim 1 wherein a clock generator provides a source clock signal at a source clock frequency.

6. The system of claim 5 wherein said multi-core processor includes a phase-locked loop that converts said source clock signal into said target clock signal.

7. The system of claim 6 wherein said phase-locked loop operates according to a PLL ratio that determines the relationship of said target clock frequency to said source clock frequency of said source clock signal.

8. The system of claim 7 wherein said clock manager determines said PLL ratio to obtain a PLL ratio value for performing said clock adjustment procedure.

9. The system of claim 1 wherein said clock manager reads processor fuses to determine one or more calculation values for performing said clock adjustment procedure.

10. The system of claim 1 wherein self-test procedures are performed on said processor cores to determine one or more calculation values for performing said clock adjustment procedure.

11. The system of claim 1 wherein said clock manager totals said functional processor cores to obtain a total functional processor-core value for performing said clock adjustment procedure.

12. The system of claim 1 wherein said clock manager totals all of said processor cores to obtain a total processor-core value for performing said clock adjustment procedure.

13. The system of claim 1 wherein said clock manager calculates said target clock frequency based upon relative quantities of said functional processor cores and said non-functional processor cores.

14. The system of claim 13 wherein a clock adjustment method is selected from either a source-clock adjustment process or a PLL-ratio adjustment process.

15. The system of claim 14 wherein said source-clock adjustment process is selected, said clock manager responsively calculating a source clock frequency from which said target clock frequency is derived, said clock manager then adjusting said source clock signal to operate at said source clock frequency.

16. A system for performing a clock adjustment procedure, comprising:
a multi-core processor that includes a plurality of processor cores that each operate with reference to a target clock signal to perform processing tasks, said processor cores including one or more non-functional processor cores, remaining ones of said processor cores being functional processor cores; and
a clock manager that performs said clock adjustment procedure by selecting a target clock frequency for said target clock signal, said target clock frequency allowing said functional processor cores to compensate for said non-functional processor cores by collectively performing said processing tasks, said clock manager calculating said target clock frequency based upon relative quantities of said functional processor cores and said non-functional processor cores, a clock adjustment method being selected from either a source-clock adjustment process or a PLL-ratio adjustment process, said source-clock adjustment process being selected, said clock manager responsively calculating a source clock frequency from which said target clock frequency is derived, said clock manager then adjusting said source clock signal to operate at said source clock frequency, said clock manager calculating said source clock frequency according to a formula:

$Nt/Nf \times F/M$ = Source Clock Frequency where said Nt is a total number of said processor cores, said Nf is a total number of said functional processor cores, said F is said target clock frequency, and said M is a PLL ratio by which said source clock frequency is increased to obtain said target clock frequency.

17. The system of claim 14 wherein said PLL-ratio adjustment process is selected, said clock manager responsively determining a PLL ratio according to which a phase-locked loop derives said target clock frequency from a source clock frequency, said clock manager then adjusting said phase-locked loop to operate at said PLL ratio.

18. A method for performing a clock adjustment procedure, comprising:
providing a multi-core processor that includes a plurality of processor cores that each operate with reference to a target clock signal to perform processing tasks, said processor cores including one or more non-functional processor cores that are in a defective condition, remaining ones of said processor cores being functional processor cores; and
utilizing a clock manager to perform said clock adjustment procedure by selecting a target clock frequency for said target clock signal based upon a ratio of said functional cores compared to a total number of said processor cores, said target clock frequency running said functional processor cores at an increased rate that compensates for said non-functional processor cores by collectively performing said processing tasks at said increased rate with said functional processor cores, said clock manager determining a latency margin for said multi-core processor to obtain a latency margin value for performing said clock adjustment procedure.

19. A system for performing a clock adjustment procedure, comprising:
an electronic device that includes a plurality of modules that each operate with reference to a target clock signal to perform tasks, said modules including one or more non-functional modules that are in a defective condition, remaining ones of said modules being functional modules; and
a clock manager that performs said clock adjustment procedure by selecting a target clock frequency for said target clock signal based upon a ratio of said functional modules compared to a total number of said modules, said target clock frequency running said functional modules at an increased rate that compensates for said non-functional modules by collectively performing said tasks at said increased rate with said functional modules, said clock manager determining a latency margin for said electronic device to obtain a latency margin value for performing said clock adjustment procedure.

* * * * *